United States Patent [19]

Kmetz

[11] Patent Number: 4,852,715
[45] Date of Patent: Aug. 1, 1989

[54] CONVEYOR SYSTEM FOR DOCUMENT-TYPE PACKAGE DISTRIBUTION

[75] Inventor: Joseph J. Kmetz, Huntington, Conn.

[73] Assignee: London & Egazarian Associates, Inc., Rye Brook, N.Y.

[21] Appl. No.: 122,258

[22] Filed: Nov. 18, 1987

[51] Int. Cl.$^4$ .............................................. B65G 37/00
[52] U.S. Cl. ..................................... 198/370; 209/900
[58] Field of Search ..................... 198/370, 861.5, 369, 198/436, 362, 592, 575; 209/698, 900, 707

[56] References Cited

U.S. PATENT DOCUMENTS 4,756,399  7/1988  Scata .................................... 198/369

FOREIGN PATENT DOCUMENTS 0239544 10/1986  Fed. Rep. of Germany ...... 209/900

Primary Examiner—Robert J. Spar
Assistant Examiner—Cheryl L. Gastineau
Attorney, Agent, or Firm—Leo Zucker

[57] ABSTRACT

A conveyor system for uniformly distributing flat articles such as packaged documents at a pick-up location, without allowing them to bunch together. The articles are dropped to land on the surface of a slide and descend to the pick-up location. A feed conveyor delivers the articles to a feed end in the vicinity of the slide. A conveyor section is arranged to pivot about an axis near its downstream end. A drive arrangement swings the conveyor section between a first position where its upstream end confronts the feed end of the feed conveyor to receive articles and convey them to its downstream end, and a second position where its upstream end is raised a certain height above the feed end of the feed conveyor. Thus, when the pivoting section is at the first position, articles delivered by the feed conveyor are then conveyed by the pivoting section and drop to land on one portion of the slide. When the pivoting section is at the second position, articles drop directly from the feed conveyor to land on a different portion of the slide. Additional pivoting conveyor sections may be arranged in tanden, and their relative pivoting movement suitably controlled, so that articles are evenly distributed across the breadth of the slide.

10 Claims, 5 Drawing Sheets

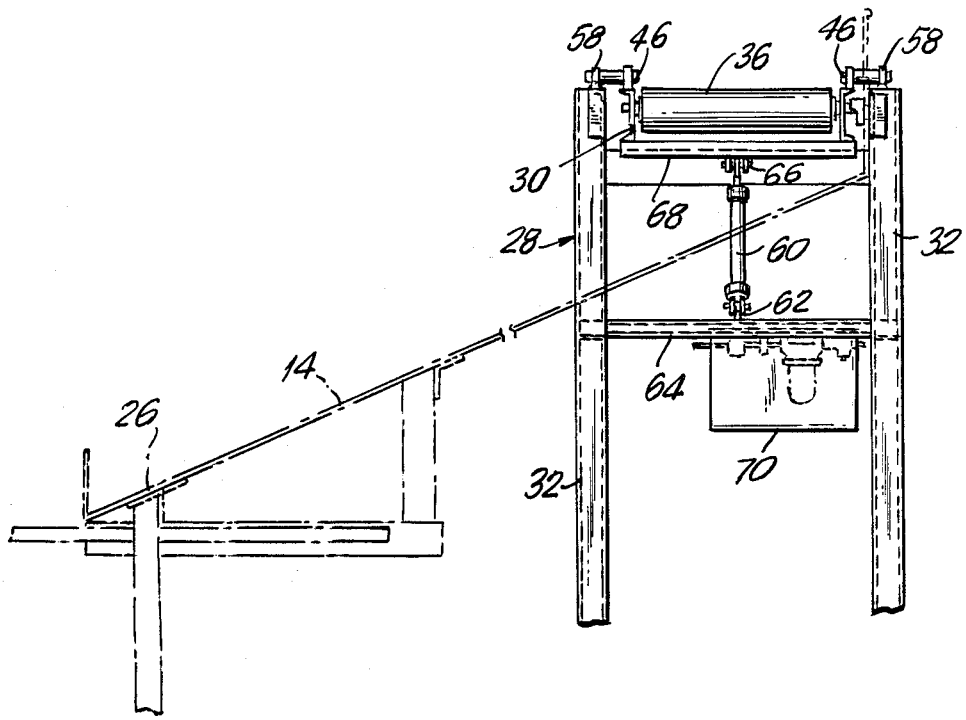
FIG.4
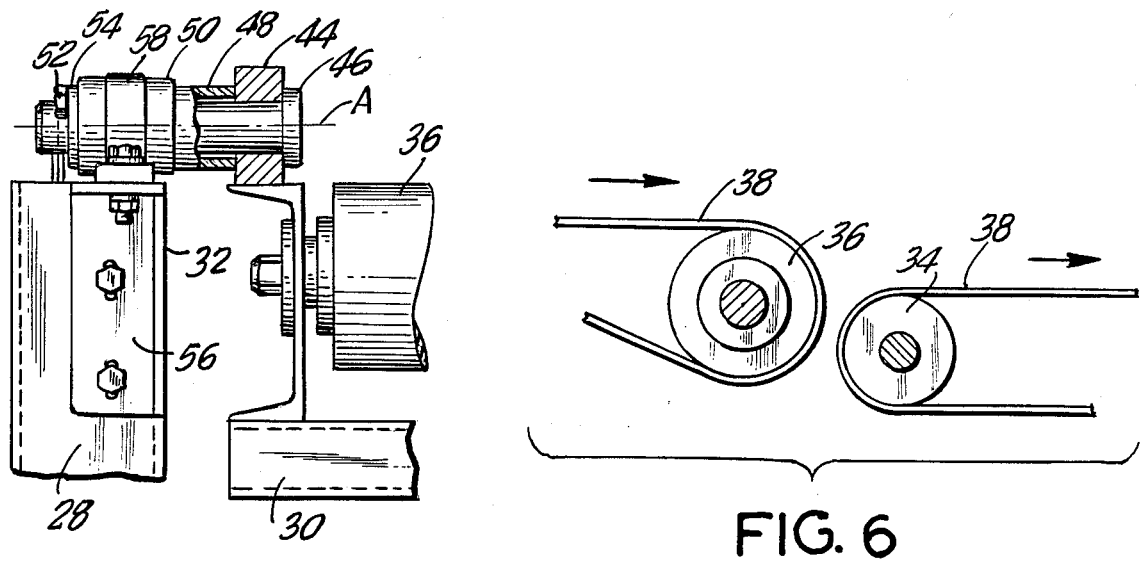
FIG. 5
FIG. 6

CONVEYOR SYSTEM FOR DOCUMENT-TYPE PACKAGE DISTRIBUTION

BACKGROUND OF THE INVENTION

1. Field of the Invention

The present invention relates generally to conveyor systems, and particularly to a system in which at least one pivoting conveyor section is arranged at a feed or delivery end of a feed conveyor for purposes of evenly distributing articles carried by the feed conveyor onto an accumulation slide.

2. Description of the Known Art

Many so-called overnight package delivery services now provide for guaranteed overnight delivery of documents contained in various kinds and sizes of envelopes usually provided by the service company. As the popularity and widespread usage of such document delivery services increases, so does the volume of envelopes destined to addresses located in a given area each day.

Packages and envelopes destined for different locations are usually picked up from various deposit locations and all transported together to a receiving station for sorting. The receiving station employs conveyor systems of the kind disclosed in my copending applications Ser. No. 917,783, filed Oct. 10, 1986, and Ser. No. 929,178, filed Nov. 10, 1986, both of which applications are now abandoned.

Small, flat packages such as envelopes containing documents or letters and destined to a particular geographical region, are initially sorted according to region and then placed on a feed conveyor which delivers the packages to another sorting area. There, the packages are caused by means such as paddles to be swept from the feed conveyor onto an accumulation slide extending adjacent and beneath the feed conveyor. The thus diverted packages land on the accumulation slide and descend to a level at which one or more persons sort the landed packages further according to their particular destinations which may be in the form of, e.g., a three-letter airport code or a five-digit address "zip" code.

A problem arises, however, when a relatively great number of packages destined for a particular region are diverted over a short period of time to land on the same accumulation slide. In such case, rather than assuming a fairly even distribution along the lower edge of the slide at which the packages are retrieved for further sorting, the packages will bunch together and, possibly, pile up on one another to such an extent that some of them will fall from the lower edge of the slide. The sorting personnel then must take the time to retrieve such documents from the floor. Also, a situation is created in which some of the documents may become lost.

An attempt to overcome the mentioend "bunching" of documents together on an accumulation slide adjacent a feed conveyor is known, wherein several paddles are arranged successively adjacent a feed conveyor in the region of the accumulation slide, and the paddles are operated sequentially to divert packages off the feed conveyor and onto the slide. When using successive paddles, however, problems arise in that letters or other relatively flat packages become lodged between the lower edge of a paddle and the surface of the feed conveyor, rather than being swept completely off the conveyor by the action of the paddle. Letters or flat packages jammed beneath an actuated paddle understandably may remain in such a condition without being noticed over a considerable length of time or, worse, can be damaged or mutilated after several actuations of the same paddle. Another problem with the known paddle arrangement arises if the clearance between the bottom edge of the paddle and the feed conveyor surface is too great, thus allowing relatively thin packages such as the now-popular "overnight" letters to run under the paddle and pass the accumulation slide for which they are intended rather than being diverted onto the slide by any of the associated paddles.

Tilt-tray systems are also known in which a series of trays linked to one another form a moving conveyor. Each tray is capable of rocking motion about an axis parallel to the direction of movement of the conveyor. When a tray carrying a package marked for a particular destination passes a corresponding receiving station, the tray is rocked to allow the package to fall from a side edge of the tray. Such a tilt-tray system does not, however, lend itself to facilitating an even distribution of packages across the breadth of an accumulation slide.

SUMMARY OF THE INVENTION

An object of the present invention is to overcome the above and other shortcomings in systems for creating an even distribution of packages across the breadth of an accumulation slide in a package conveyor installation.

Another object of the invention is to provide a system for distributing substantially flat articles uniformly along a lower edge of an accumulation slide.

A further object of the invention is to provide a conveyor system in which flat articles are made to land substantially uniformly along the breadth of an accumulation slide, without the use of paddles or tilt trays.

According to the invention, a conveyor system for distributing flat articles uniformly at a pick-up location in a sorting conveyor installation, includes accumulation slide means forming a slide surface for receiving flat articles landing on the slide surface and causing the articles to descend to an article pick-up area, and feed conveyor means for delivering the flat articles to a feed end in the region of the accumulation slide means. First pivot conveyor means having an upstream end and a downstream end, is mounted for swinging movement about an axis located in the vicinity of its downstream end. First pivot drive means operates to swing the first pivot conveyor means between a first position at which the upstream end confronts the feed end of the feed conveyor means to receive articles and the pivot conveyor means conveys the articles to the downstream end, and a second position at which the upstream end is raised a certain height above the feed end of the feed conveyor means. Said feed end is positioned over a first landing portion of the slide surface of the accumulation slide means, and the downstream end of the pivot conveyor means is positioned over a second landing portion of the slide surface. Accordingly, when the pivot conveyor means is at the first position, articles delivered to said feed end are received and conveyed by the pivot conveyor means to land on the second landing portion of the slide means, and when the pivot conveyor means is at the second position, articles delivered to said feed end drop freely to land on the first landing portion of the slide means.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing:

FIG. 4 is a side elevational view of the tandem pivoting conveyor sections as viewed from the right side of FIG. 3;

FIG. 5 is an enlarged view, partly in section, of a pivoting arrangement by which the conveyor sections are mounted on a frame;

FIG. 6 is an enlarged sectional view taken along line 6—6 in FIG. 2;

DETAILED DESCRIPTION OF THE INVENTION

Figure 1:
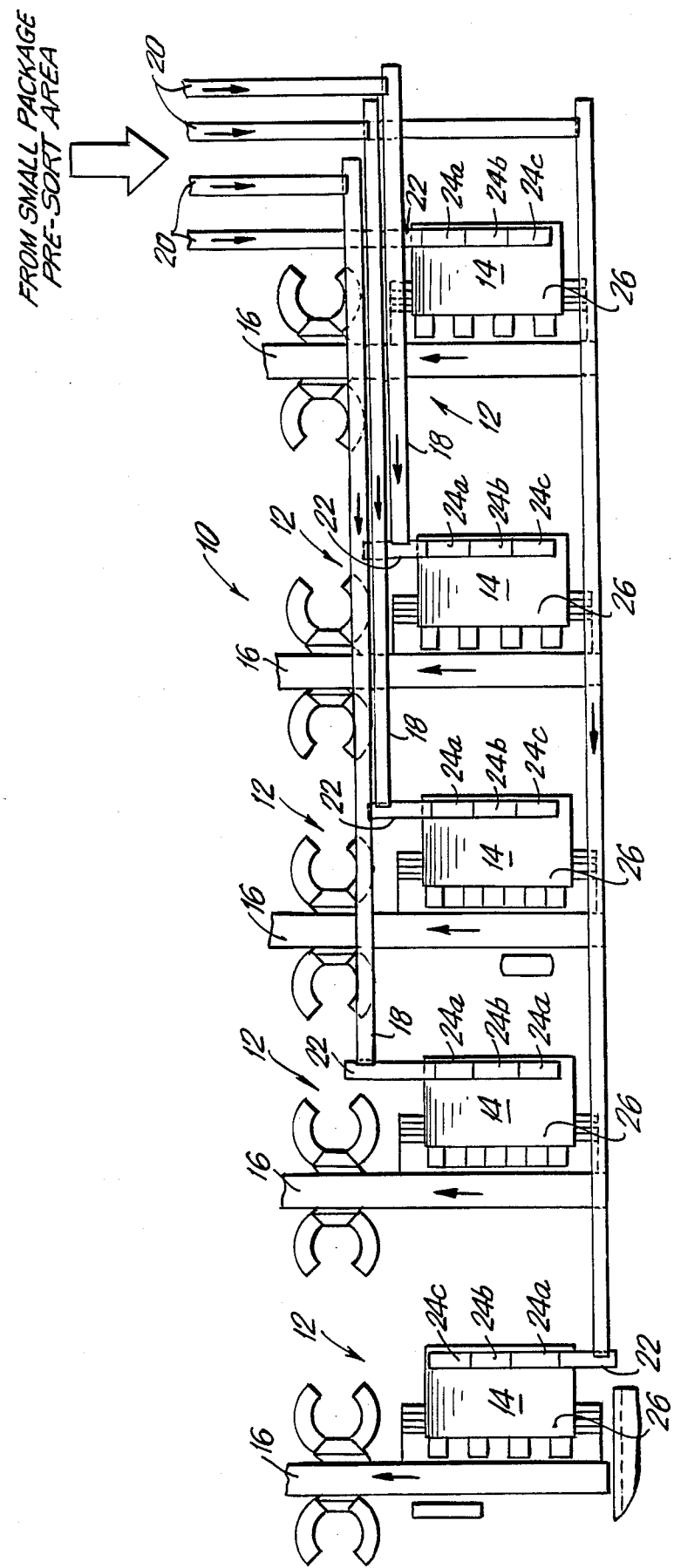
FIG. 1 is a plan view of a part of a conveyor installation in which the present distribution system is employed.
Figure 2:
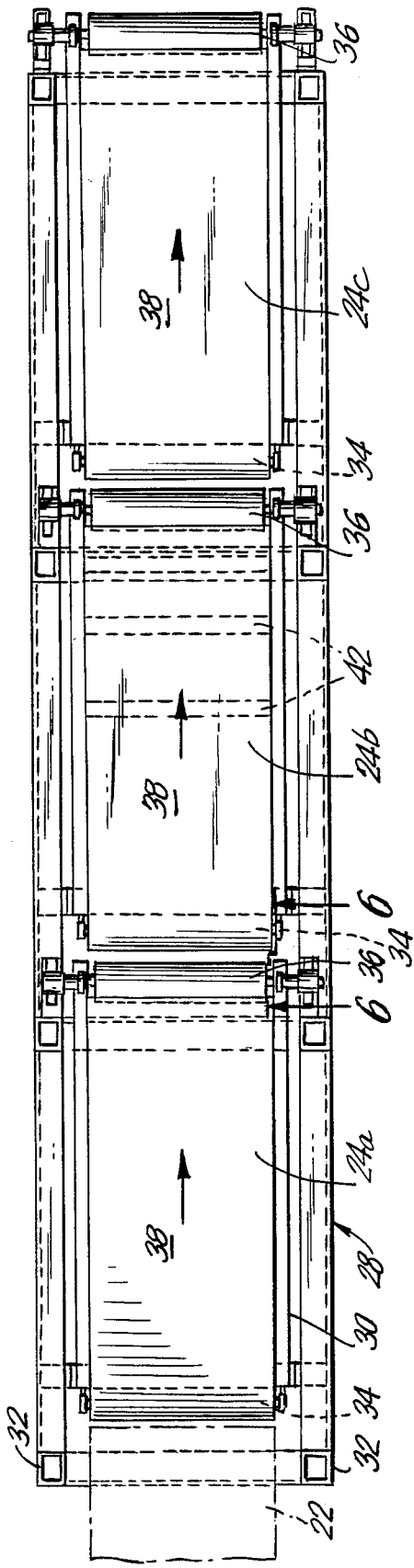
FIG. 2 is an enlarged plan view of three tandem pivoting conveyor sections in the installation of FIG. 1, according to the invention.
Figure 3:
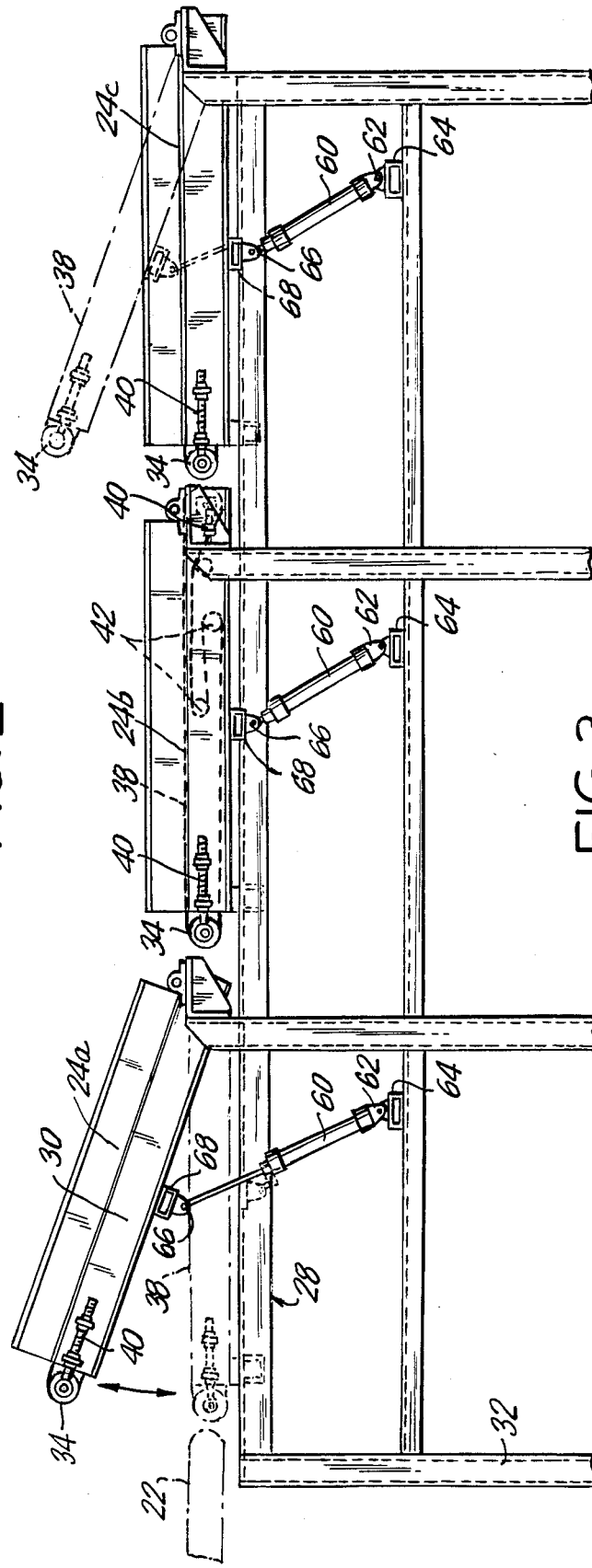
FIG. 3 is an elevational view of the pivoting conveyor sections in FIG. 2.

FIG. 1 shows part of a conveyor installation 10 in which the conveyor system of the present invention is employed. For example, the installation 10 can be one which includes induction areas 12 at which relatively flat packages or articles are received on induction or accumulation slides 14 and picked up from the slides 14 by sorters for placement on selected moving conveyor belts 16. For details of the induction areas 12 with associated conveyor belts 16, reference is made to my copending application Ser. No. 929,178, relevant portions of which are incorporated herein by reference.

Small, flat packages or articles are delivered to each of the induction areas 12 by associated feed conveyors 18 on the upsteam ends of which flat packaged documents are deposited by a series of conveyors 20 originating from a small package presort area (not shown) of the overall conveyor installation 10.

At the downstream end of each feed conveyor 18, there is provided a relatively short feed or "accumulating" conveyor section 22 the upstream end of which is arranged to receive articles delivered to the downstream ends of the feed conveyors 18.

Each feed conveyor section 22 is arranged with its down stream end adjacent a series of three pivoting conveyor sections 24a, 24b & 24c arranged in tandem. The induction or accumulation slides 14 each present a slide surface beneath the pivoting conveyor sections 24a–c at each induction area 12 with the slide surface extending beneath the feed end of the feed conveyor section 22 at each of the areas 12. The surfaces of the accumulation slides 14 are inclined so that flat articles landing on the slide surface will descend in a slide direction to an article pick-up area 26 of the slide 14.

Each feed or accumulating conveyor section 22 is selfpowered and can be made to engage or disengage by way of an electromechanical clutch/brake motor drive (not shown in FIG. 1). When the clutch/brake motor drive disengages, flat articles delivered to the upstream ends of the feed conveyor sections 22 will accumulate momentarily, rather than being delivered to the feed ends of the conveyor sections 22 for reasons which will be explained below. A suitable clutch/brake mechanism for each of the feed conveyor sections 22 may be obtained from Warner Electric Brake & Clutch Company as model number EM-50.

Details of each series of pivoting conveyor sections 24a–c are shown in FIGS. 2-6. The conveyor sections 24a–c are mounted on a common frame 28 at each of the induction areas 12. The conveyor sections 24a–c are essentially identical to one another in construction as well as in the manner of their attachment to the frame 28 and their associated pivoting mechanisms. Specifically, each pivoting conveyor section comprises a generally rectangular frame 30 the width of which is narrow enough to be contained between legs 32 of the common frame 28. Each conveyor section frame 30 has a free-spinning tail pulley 34 mounted transversely of the section frame 30 at an upstream end. A self-powered head pulley 36 is mounted transversely of each section frame 30 at a downstream end of the section frame 30. A motorized pulley suitable for use as each of the head pulleys 36 may be obtained from Van Der Graaf Canada, Inc. as model TM127. Between the tail pulley 34 and head pulley 36 of each pivoting conveyor section is stretched lightweight conveyor belting with a textile content of, e.g., 50—50 cotton polyester blend with a friction surface on both sides. A known source for the belting 38 is B. F. Goodrich Company, as 5-ply SCP 14 Hycar or equivalent. The conveyor belting 38 for the pivoting conveyor sections is typically 24 inches wide to match the face width of the mentioned head pulley 36. A typical running speed for the conveyor belting 38 is about 200 feet per minute.

The tail and head pulleys 34, 36 are mounted on each section frame 30 with well-known adjustable positioning mechanisms 40 for accurate adjustment of the pulley positions along the length of the frame 30. Also, a well-known conveyor belt tightening mechanism 42 is provided on each section frame 30 for adjusting the conveyor belting 38 to a desired tension.

Details of the mounting of each of the pivoting conveyor sections 24a–c to the common frame 28 are shown in FIG. 5. Each of the pivoting sections pivots about an axis A located directly above the head pulley 36. An upstanding lug 44 is fixed to the section frame 30 above the head pulley 36, and has an opening for receiving a pivot pin 46. A spacer 48 surrounds the pivot pin 46 to allow adequate clearance between the section frame 30 and the common frame 28. The pin 46 extends through a pillow block 50 (e.g., Boston Gear PPB24-1-1/2), and is locked in axial position by a cotter pin 52 which rotates against a washer 54 between the cotter pin 52 and an end face of the pillow block 50. The block 50 is secured to the top of one of the legs 32 of the common frame 28 by a right-angle piece 56 and a U-clamp 58.

Each of the pivoting conveyor sections 24a–c has an associated pneumatic cylinder 60 for raising or lowering the section in response to a controlled pressured air supply (not shown). Each cylinder 60 is of a kind which may be obtained from, e.g., Milwaukee Cylinder as model AG1 NFPA style MP1(double acting). The cylinder 60 should have an internal stop in the extended direction, and an internal cushion in both extended and retracted positions. The blind end of the cylinder 60 is arranged for a clevis mount 62 on a corresponding cross-member 64 of the common frame 28. The rod end of each cylinder 60 has a spherical rod eye for receiving a hinge pin 66 supported along the length of another cross-member 68 on the bottom of each section frame 30. The stroke for each cylinder 60 is typically 11 inches with a two inch bore.

As shown in FIG. 6, when in the lower position, the head pulley 36 of an upstream conveyor section should be higher than the tail pulley 34 of the next section. Typically, a tangent line drawn from the top of the head pulley 36 should be about two inches higher than a line tangent to the top of the adjacent tail pulley 34. Also, the pulleys 36, 34 with the conveyor belts 38, should be spaced no more than about ½ inch apart when in the lowered position.

A cape 70 (FIG. 4) for containing an air lubricator and solenoid switching valve is mounted on one of the cross-members 64 of the common frame 28. Pressurized air supply lines (not shown) are distributed from the cage 70 to each of the cylinders 60 to allow pivoting motion of each of the conveyor sections 24a–c to be implemented when air pressure in the lines is selectively applied.

Figure 7:
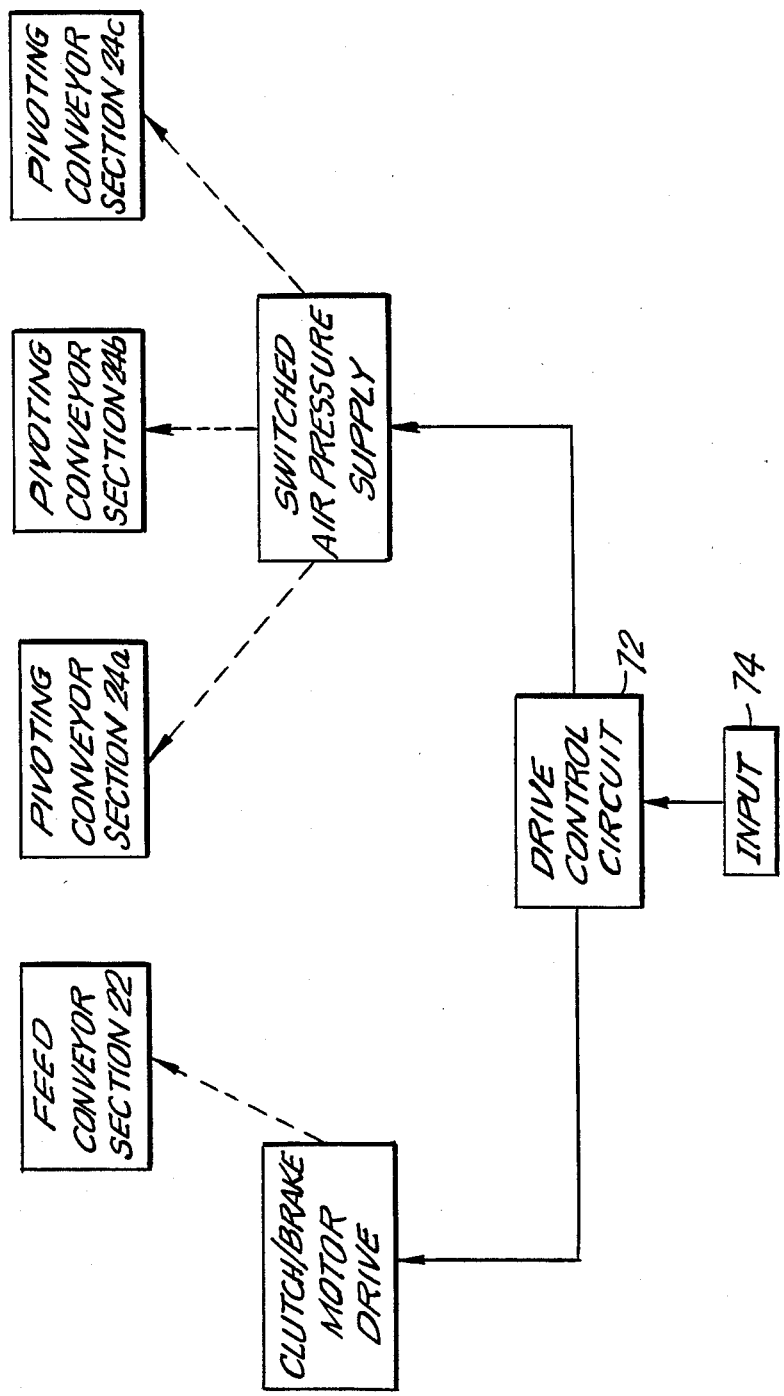
FIG. 7 is a schematic block diagram of a drive arrangement for operating the present system.

FIG. 7 is a block diagram of a drive control arrangement for operating the accumulating conveyor section 22, and each of the pivoting conveyor sections 24a–c in a desired time sequence according to the invention.

Figure 8:
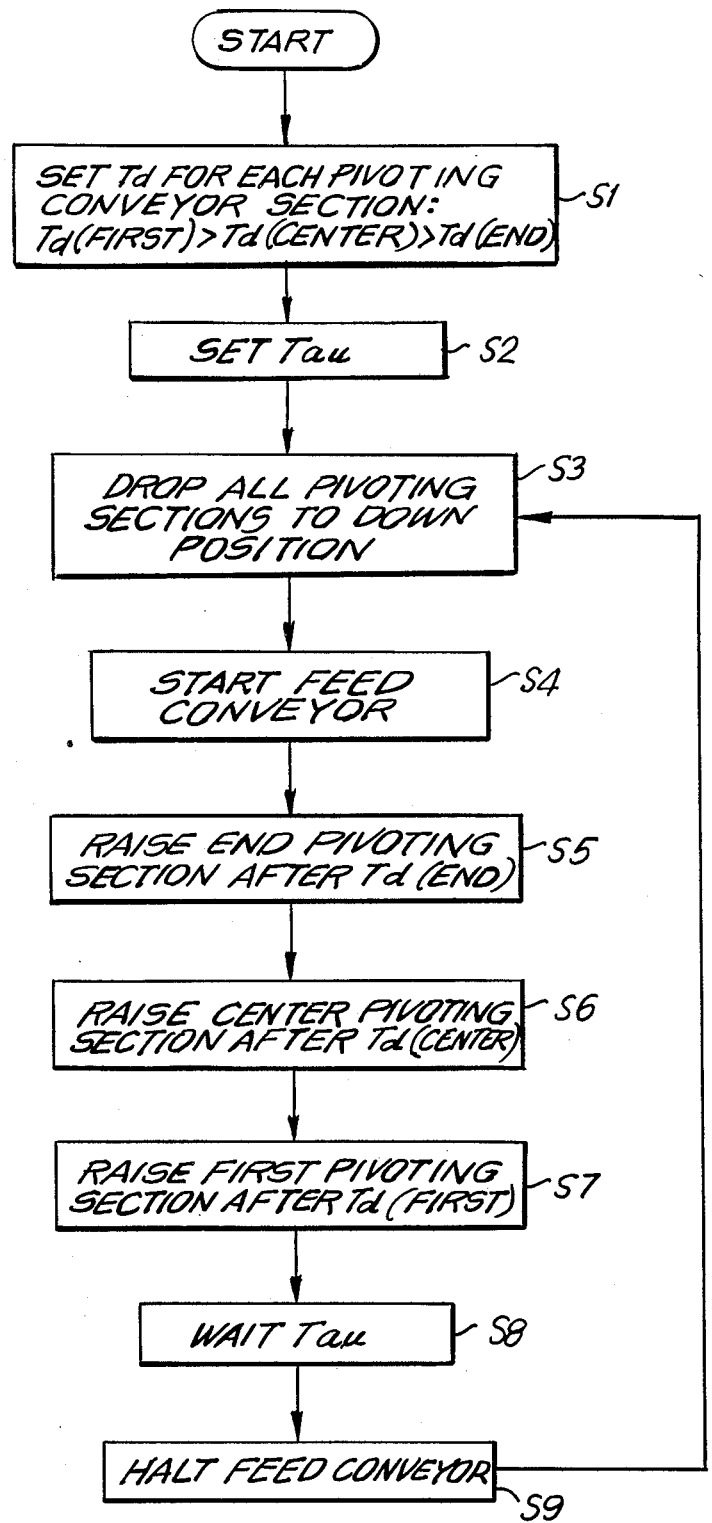
FIG. 8 is a flow chart representing various operational steps in the present system.

FIG. 8 is a flow chart showing steps carried out by the circuit arrangement of FIG. 7.

By selectively raising and lowering the positions of the pivoting sections 24a, 24b and 24c, articles delivered to the feed section 22 can be distributed evenly among four areas along the breadth of the induction slide 14.

Also, prior to lowering of the pivoting section 24a, the feed section 22 should be momentarily halted by its associated clutch/brake motor drive in response to a halt command signal from drive control circuit 72 (FIG. 7), so that no articles might get caught between the feed end of the section 22 and the tail pulley 34 of the pivoting section 24a as the tail pulley 34 drops near the downstream end of the feed section 22.

As will be understood, although the present embodiment shows three pivoting sections 24a–c, one, two, four or more like tandem pivoting sections may be arranged according to a particular need.

A preferred sequence of operation for the three pivoting sections 24a–c of the present embodiment, will now be explained.

When the overall system represented in FIG. 7 is started, certain "down" time periods are entered for the first pivoting section (24a), the center section (24b) and the end section (24c), by suitable input means (74) into the drive control circuit 72. See step S1 in FIG. 8. The down time Td for the first section is greater than that for the center section, and Td for the center section is greateer than that for the end section.

Control circuit 72 may be contained within, for example, a programmable controller unit model PLC-2/30 made by Allen-Bradley Company. Manual override should be available to allow an operator to take control of the movement of any conveyor section.

Next, in step S2, a desired "all up" time Tau is set in the control circuit 72 through input means 74, wherein Tau corresponds to a time period during which all the pivoting sections are maintained at a raised position simultaneously.

In step S3, all the pivoting sections are lowered to a down position by switching off the supplies of pressurized air to each of the cylinders 60. Pressurized air in each of the cylinders may be allowed to vent to the atmosphere so that each of the pivoting sections 24a–c descends as quickly as possible. A start command signal is generated by the control circuit 72 in step S4 to start the feed conveyor section 22. Articles accumulated on the feed section 22 are then conveyed by the pivoting sections 24a and 24b onto the pivoting section 24c. It is noted that each of the pivoting sections 24a–c are allowed to run continuously whether in a raised or a lowered position.

As long as the pivoting section 24c (end section) remains lowered to receive articles, section 24c will convey the articles to its downstream end from which the articles will fall onto a corresponding landing portion of the accumulation slide 14 directly beneath the downstream end of the pivoting section 24c. After the time Td for the end section elapses, the section 24c is raised in step S5. At that time, articles on the conveyor belting of the section 24c will slide off the downstream end of the section 24c and no new articles will be received by the belting. Articles conveyed by the center pivoting section 24b will then begin to fall from the downstream end of the section 24b to land on a different portion of the accumulation slide 14. Such articles will then descend along the slide 14 without "bunching" with those articles dropped onto the slide 14 by the end pivoting section 24c.

After the down time TD for the center section 24b elapses, the center section 24b is raised in step S6. Articles on the center section 24b when the section is raised will then slide from the downstream end of the section 24b to land on the corresponding portion of the slide 14. Articles conveyed by the first pivoting section 24a will then drop from the downstream end of the section 24a to land on a different corresponding portion of the slide 14 and descend the slide to the pick-up area 26 without bunching with those articles dropped from the sections 24a and 24b.

After the down time Td for the first pivoting section 24a elapses, the section 24a is raised in step S7. Articles on the section 24a at the time will then slide off the downstream end of the section 24a, while articles delivered by the feed or accumulating conveyor section 22 will then drop from the downstream or feed end of the section 22 to land on a different corresponding portion of the slide 14, and descend the slide to pick-up area 26 out of the way of articles already deposited at the pick-up area 26 by action of the pivoting conveyors 24a–c.

The feed conveyor section 22 continues to run in step S8 for the "all up" time period Tau during which the three pivoting sections 24a–c are all raised. Then, in step S9, the feed section 22 is halted momentarily by operation of the control circuit 72 and the process returns to step S3 in which all the pivoting sections 24a–c are caused to drop to a down position.

A typical down time for the end pivoting section 24c may be between 20 to 30 seconds. The center pivoting section 24b may remain down for between 5 to 10 seconds longer than the end sections 24c. The first pivoting section 24a also may remain down for between 5 to 10 seconds longer than the center pivoting section 24b. The time during which all sections are raised (Tau) may be set to, for example, between 5 to 10 seconds.

While the foregoing description represents a preferred embodiment of the invention, it will be obvious to those skilled in the art that various changes and modifications may be made, without departing from the true spirit and scope of the present invention.

I claim:

1. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end; and first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to the feed end associated with said feed conveyor means are received and conveyed by said first pivot conveyor means to land on a portion of said slide surface other than said first landing portion, and when said first pivot conveyor means is at said second position, articles delivered to said feed end drop freely to land on the first landing portion of said slide surface; and wherein said feed conveyor means includes clutch/brake means for momentarily halting movement of said feed conveyor means just before said first pivot conveyor means drops from its second position to its first position, in response to a halt command signal, so that articles delivered to said feed end are not caught between said feed end and the upstream end of said first pivot conveyor means.

2. A conveyor system according to claim 1, including second pivot conveyor means having an upstream end and a downstream end, wherein said second pivot conveyor means is mounted for swinging movement about an axis located in the vicinity of its downstream end; and second pivot drive means for swinging said second pivot conveyor means between a first position at which its upstream end confronts the downstream end of said first pivot conveyor means to receive articles and said second pivot conveyor means conveys the received articles to its downstream end, and a second position at which its upstream end is raised a certain height above the downstream end of said first pivot conveyor means;

wherein the downstream end of said second pivot conveyor means is positioned over a third landing portion of the slide surface of said slide means, so that when said second pivot conveyor means is at its first position, articles delivered to the downstream end of said first pivot conveyor means are received and conveyed by said second pivot conveyor means to land on a portion of said slide surface other than said first or said second landing portions, and when said second pivot conveyor means is at its second position, articles delivered to the downstream end of said first pivot conveyor means drop freely to land on said second landing portion.

3. A conveyor system according to claim 2, including third pivot conveyor means having an upstream end and a downstream end, wherein said third pivot conveyor means is mounted for swinging movement about an axis located in the vicinity of its downstream end;

third pivot drive means for swinging said third pivot conveyor means between a first position at which its upstream end confronts the downstream end of said second pivot conveyor means to receive articles and said third pivot conveyor means conveys the received articles to its downstream end, and a second position at which its upstream end is raised a certain height above the downstream end of said second pivot conveyor means;

wherein the downstream end of said third pivot conveyor means is positioned over a fourth landing portion of said slide surface, so that when said third pivot conveyor means is at its first position, articles delivered to the downstream end of said second pivot conveyor means are received and conveyed by said third pivot conveyor means to land on a portion of said slide surface other than said first, said second or said third landing portions, and when said third pivot conveyor means is at its second position, articles delivered to the downstream end of said second pivot conveyor means drop freely to land on said third landing portion.

4. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to said feed end are received and conveyed by said first pivot conveyor means to land on a portionof said slide surface other than said first landing portion, and when said first pivot conveyor means is at said second position, articles delivered to said feed end drop freely to land on the first landing portion of said slide surface; and timing control means for setting desired periods during which said first pivot conveyor means is at each of its first and second positions;

wherein said feed conveyor means includes clutch/brake means for momentarily halting movement of said feed conveyor means just before said first pivot conveyor means drops from its second position to its first position, in response to a halt command signal, so that articles delivered to said feed end are not caught between said feed end and the upstream end of said first pivot conveyor means.

5. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to said feed end are received and conveyed by said first pivot conveyor means to land on a portion of said slide surface other than said first landing portion, and when said first pivot conveyor means is at said second position, articles delivered to said feed end drop freely to land on the first landing portion of said slide surface;

second pivot conveyor means having an upstream end and a downstream end, wherein said second pivot conveyor means is mounted for swinging movement about an axis located in the vicinity of its downstream end;

second pivot drive means for swinging said second pivot conveyor means between a first position at which its upstream end confronts the downstream end of said first pivot conveyor means to receive articles and said second pivot conveyor means conveys the received articles to its downstream end, and a second position at which its upstream end is raised a certain height above the downstream end of said first pivot conveyor means;

wherein the downstream end of said second pivot conveyor means is positioned over a third landing portion of the slide surface of said slide means, so that when said second pivot conveyor means is at its first position, articles delivered to the downstream end of said first pivot conveyor means are received and conveyed by said second pivot conveyor means to land on a portion of said slide surface other than said first or said second landing portions, and when said second pivot conveyor means is at its second position, articles delivered to the downstream end of said first pivot conveyor means drop freely to land on said second landing portion;

timing control means for setting desired periods during which said first and said second pivot conveyor means are at each of their corresponding first and second positions, and for causing said second pivot drive means to raise said second pivot conveyor means from its first position to its second position while said first pivot conveyor means is maintained at its first position by said first pivot drive means;

wherein said timing control means includes means for causing said first pivot drive means to raise said first pivot conveyor means from its first position to its second position while said second pivot conveyor means is maintained at its second position by said second pivot drive means; and wherein said feed conveyor means includes clutch/brake means for momentarily halting movement of said feed conveyor means just before said first pivot conveyor means drops from its second position to its first position, in response to a halt command signal, so that articles delivered to said feed end are not caught between said feed end and the upstream end of said first pivot conveyor means.

6. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to the feed end associated with said feed conveyor means are received and conveyed by said first pivot conveyor means to land on a portion of said slide surface other than said first landing portion, and when said first pivot conveyor means is at said second position, articles delivered to said feed end drop freely to land on the first landing portion of said slide surface;

second pivot conveyor means having an upstream end and a downstream end, wherein said second pivot conveyor means is mounted for swinging movement about an axis located in the vicinity of its downstream end;

second pivot drive means for swinging said second pivot conveyor means between a first position at which its upstream end confronts the downstream end of said first pivot conveyor means to receive articles and said second pivot conveyor means conveys the received articles to its downstream end, and a second position at which its upstream end is raised a certain height above the downstream end of said first pivot conveyor means;

wherein the downstream end of said second pivot conveyor means is positioned over a third landing portion of the slide surface of said slide means, so that when said second pivot conveyor means is at its first position, articles delivered to the downstream end of said first pivot conveyor means are received and conveyed by said second pivot conveyor means to land on a portion of said slide surface other than said first or said second landing portions, and when said second pivot conveyor means is at its second position, articles delivered to the downstream end of said first pivot conveyor means drop freely to land on said second landing portion;

third pivot conveyor means having an upstream end and a downstream end, wherein said third pivot conveyor means is mounted for swinging movement about an axis located in the vicinity of its downstream end;

third pivot drive means for swinging said third pivot conveyor means between a first position at which its upstream end confronts the downstream end of said second pivot conveyor means to receive articles and said third pivot conveyor means conveys the received articles to its downstream end, and a second position at which its upstream end is raised a certain height above the downstream end of said second pivot conveyor means;

wherein the downstream end of said third pivot conveyor means is positioned over a fourth landing portion of said slide surface, so that when said third pivot conveyor means is at its first position, articles delivered to the downstream end of said second pivot conveyor means are received and conveyed by said third pivot conveyor means to land on a portion of said slide surface other than said first, said second, or said third landing portions, and when said third pivot conveyor means is at its second position, articles delivered to the downstream end of said second pivot conveyor means drop freely to land on said third landing portion;

timing control means for setting desired periods during which said first, said second and said third pivot conveyor means are at each of their corresponding first and second positions, and for causing said third pivot drive mans to raise said third pivot conveyor means from its first position to its second position while said second pivot conveyor means and said first pivot conveyor means are maintained at their corresponding first positions by said second and said first pivot drive means, and for causing said second pivot drive means subsequently to raise said second pivot conveyor means from its first position to its second position while said third pivot conveyor means is maintained at its second position by said third pivot drive means and said first pivot conveyor means is maintained at its first position by said first pivot drive means;

wherein said timing control means includes means for causing said first pivot drive means to raise said first pivot conveyor means from its first positioin to its second position while said second and said third pivot conveyor means are maintained at their corresponding second positions by said second and said third pivot drive means; and wherein said feed conveyor means includes clutch/brake means for momentarily halting movement of said feed conveyor means just before said first pivot conveyor means drops from its second position to its first position, in response to a halt command signal, so that articles delivered to said feed end are not caught between said feed end and the upstream end of said first pivot conveyor means.

7. A conveyor system according to claim 6, wherein said timing control means includes means for causing said first, said second, and said third pivot drive means to drop the associated pivot conveyor means simultaneously from their corresponding second positions to their first positions.

8. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end; and wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to the feed end associated with said feed conveyor means are received and conveyed by said first pivot conveyor means to land on a portion of said slide surface other than said first landing portion, and when said first pivot conveyor means is at said second position, articles delivered to said feed end drop freely to land on the first landing portion of said slide surface; and wherein said first pivot conveyor means comprises a conveyor section including a generally rectangular frame one end of which defines said upstream end and an opposite end of which defines said downstream end, a conveyor belt, a tail roller mounted for free rotation at said upstream end for engaging and guiding said conveyor belt for feeding movement, and a head roller mounted at the downstream end of said frame for engaging and driving said belt in said feed direction, said head roller including an associated motor.

9. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to the feed end associated with said feed conveyor means are received and conveyed by said first pivot conveyor means to land on a portion of said slide surface other than said first landing portion, and when said first pivot conveyor means is at said second position, articles delivered to said feed end drop freely to land on the first landing portion of said slide surface;

second pivot conveyor means having an upstream end and a downstream end, wherein said second pivot conveyor means is mounted for swinging movement about an axis located in the vicinity of its downstream end;

second pivot drive means for swinging said second pivot conveyor means between a first position at which its upstream end confronts the downstream end of said first pivot conveyor means to receive articles and said second pivot conveyor means conveys the received articles to its downstream end, and a second position at which its upstream end is raised a certain height above the downstream end of said first pivot conveyor means;

wherein the downstream end of said second pivot conveyor means is positioned over a third landing portion of the slide surface of said slide means, so that when said second pivot conveyor means is at its first position, articles delivered to the downstream end of said first pivot conveyor means are received and conveyed by said second pivot conveyor means to land on a portion of said slide surface other than said first or said second landing portions, and when said second pivot conveyor means is at its second position, articles delivered to the downstream end of said first pivot conveyor means drop freely to land on said second landing portion; and wherein each of said first and said second pivot conveyor means comprises a conveyor section including a generally rectangular frame one end of which defines said upstream end and an opposite end of which defines said downstream end, a conveyor belt, a tail roller mounted for free rotation at said upstream end for engaging and guiding said conveyor belt for feeding movement, and a head roller mounted at the downstream end of said frame for engaging and driving said belt in said feed direction, said head roller including an associated motor.

10. A conveyor system for distributing generally flat articles uniformly at an article pick-up location in a sorting conveyor installation, comprising:

slide means forming a slide surface, for receiving generally flat articles landing on said slide surface and directing the landed articles to an article pick-up area;

feed conveyor means for delivering articles to an associated feed end in the vicinity of said slide means;

first pivot conveyor means having an upstream end and a downstream end, wherein said first pivot conveyor means is mounted for swinging movement about an axis located in the vicinity of its downstream end;

first pivot drive means for swinging said first pivot conveyor means between a first position at which its upstream end confronts the feed end associated with said feed conveyor means to receive articles and said first pivot conveyor means conveys the received articles to its downstream end, and a second position at which its upstream end is raised a certain height above said feed end;

wherein the feed end associated with said feed conveyor means is positioned over a first landing portion of said slide surface, and the downstream end of said first pivot conveyor means is positioned over a second landing portion of said slide surface, so that when said first pivot conveyor means is at said first position, articles delivered to the feed end associated with said feed conveyor means are received and conveyed by said first pivot conveyor means to land on a portion of said slide surface other than said first landing portion, and when said first pivot conveyor means is at said second position, articles delivered to said feed end drop freely to land on the first landing portion of said slide surface;

second pivot conveyor means having an upstream end and a downstream end, wherein said second pivot conveyor means is mounted for swinging movement about an axis located in the vicinity of its downstream end;

second pivot drive means for swinging said second pivot conveyor means between a first position at which its upstream end confronts the downstream end of said first pivot conveyor means to receive articles and said second pivot conveyor means conveys the received articles to its downstream end, and a second position at which its upstream end is raised a certain height above the downstream end of said first pivot conveyor means;

wherein the downstream end of said second pivot conveyor means is positioned over a third landing portion of the slide surface of said slide means, so that when said second pivot conveyor means is at its first position, articles delivered to the downstream end of said first pivot conveyor means are received and conveyed by said second pivot conveyor means to land on a portion of said slide surface other than said first or said second landing portions, and when said second pivot conveyor means is at its second position, articles delivered to the downstream end of said first pivot conveyor means drop freely to land on said second landing portion;

third pivot conveyor means having an upstream end and a downstream end, wherein said third pivot conveyor means is mounted for swinging movement about an axis located in the vicinity of its downstream end;

third pivot drive means for swinging said third pivot conveyor means between a first position at which its upstream end confronts the downstream end of said second pivot conveyor means to receive articles and said third pivot conveyor means conveys the received articles to its downstream end, and a second position at which its upstream end is raised a certain height above the downstream end of said second pivot conveyor means;

wherein the downstream end of said third pivot conveyor means is positioned over a fourth landing portion of said slide surface, so that when said third pivot conveyor means is at its first position, articles delivered to the downstream end of said second pivot conveyor means are received and conveyed by said third pivot conveyor means to land on a portion of said slide surface other than said first, said second or said third landing portions, and when said third pivot conveyor means is at its second position, articles delivered to the downstream end of said second pivot conveyor means drop freely to land on said third landing portion; and wherein each of said first, said second and said third pivot conveyor means comprises a conveyor section including a generally rectangular frame one end of which defines said upstream end and an opposite end of which defines said downstream end, a conveyor belt, a tail roller mounted for free rotation at said upstream end for engaging and guiding said conveyor belt for feeding movement, and a head roller mounted at the downstream end of said frame for engaging and driving said belt in said feed direction, said head roller including an associated motor.

* * * * *